United States Patent
Yang et al.

(10) Patent No.: US 8,898,213 B2
(45) Date of Patent: Nov. 25, 2014

(54) APPARATUS AND METHOD FOR DIVISION OF A GALOIS FIELD BINARY POLYNOMIAL

(75) Inventors: Ho Yang, Hwaseong-si (KR); Hyun Seok Lee, Seoul (KR); Ji Hoon Bang, Yongin-si (KR); Young Hwan Park, Yongin-si (KR); Ki Taek Bae, Hwaseong-si (KR); Kyeong Yeon Kim, Hwaseong-si (KR)

(73) Assignees: Samsung Electronics Co., Ltd., Suwon-si (KR); Kwangwoon University Industry-Academic Collaboration Foundation, Seoul (KR)

( * ) Notice: Subject to any disclaimer, the term of this patent is extended or adjusted under 35 U.S.C. 154(b) by 412 days.

(21) Appl. No.: 13/324,322

(22) Filed: Dec. 13, 2011

(65) Prior Publication Data

US 2012/0173598 A1    Jul. 5, 2012

(30) Foreign Application Priority Data

Dec. 30, 2010   (KR) ........................ 10-2010-0139042

(51) Int. Cl.
   *G06F 7/72*   (2006.01)
(52) U.S. Cl.
   CPC ...................................... *G06F 7/724* (2013.01)
   USPC ........................................................ 708/492
(58) Field of Classification Search
   None
   See application file for complete search history.

(56) References Cited

U.S. PATENT DOCUMENTS

| | | | | |
|---|---|---|---|---|
| 6,366,941 B1 * | 4/2002 | Wolf et al. | ..................... | 708/492 |
| 6,721,771 B1 * | 4/2004 | Chang | ........................... | 708/492 |
| 6,766,344 B2 | 7/2004 | Dubey et al. | | |
| 7,930,335 B2 * | 4/2011 | Gura et al. | ..................... | 708/492 |
| 2012/0117441 A1 * | 5/2012 | Hansen et al. | ................ | 714/752 |
| 2012/0173598 A1 * | 7/2012 | Yang et al. | ..................... | 708/230 |

FOREIGN PATENT DOCUMENTS

| | | |
|---|---|---|
| JP | 7248930 | 9/1995 |
| KR | 10-2000-0061196 A | 10/2000 |
| KR | 10-0431576 B1 | 5/2004 |
| KR | 10-2005-0120460 A | 12/2005 |
| KR | 10-2006-0005156 A | 1/2006 |
| KR | 10-2006-0036383 A | 4/2006 |
| KR | 10-2006-0101039 A | 9/2006 |
| KR | 10-2007-0069259 A | 7/2007 |
| KR | 10-2008-00685555 A | 7/2008 |

OTHER PUBLICATIONS

Cho, Junho et al., "Efficient Software-Based Encoding and Decoding of BCH Cdes," IEEE Transactions on Computers, Jul. 2009, pp. 878-889, vol. 58, No. 7.

Moudgill, Mayan et al., "Galois Field Instructions in the Sandblater 2.0 Architecture," International Journal of Digital Multimedia Broadcasting, Aug. 26, 2009, pp. 1-5, vol. 2009, Article I.D. 129698, Hindawi Publishing Corporation.

* cited by examiner

*Primary Examiner* — David H Malzahn
(74) *Attorney, Agent, or Firm* — NSIP Law

(57) ABSTRACT

An apparatus and method for processing a division of a binary polynomial are provided. The apparatus includes a plurality of exclusive OR (XOR) operators that may perform a selective XOR operation with respect to a conditional bit of a dividend polynomial. The plurality of XOR operators may perform selective XOR operations in parallel and accordingly, a division of a binary polynomial may be rapidly performed.

21 Claims, 11 Drawing Sheets

APPARATUS AND METHOD FOR DIVISION OF A GALOIS FIELD BINARY POLYNOMIAL

CROSS-REFERENCE TO RELATED APPLICATION(S)

This application claims the benefit under 35 U.S.C. §119(a) of Korean Patent Application No. 10-2010-0139042, filed on Dec. 30, 2010, in the Korean Intellectual Property Office, the entire disclosure of which is incorporated herein by reference.

BACKGROUND

1. Field

The following description relates to an apparatus and method for performing a division on a Galois field binary polynomial, and additionally, to an apparatus and method for a division of a Galois field binary polynomial using a Single Instruction Multiple Data (SIMD) processor.

2. Description of Related Art

A division of a Galois field binary polynomial may be used frequently by a coding apparatus for error correction, or by an encryption apparatus for security. A considerable amount of time may be consumed to process the division of the Galois field binary polynomial for a long dividend polynomial.

To reduce processing time when a division of a binary polynomial is processed using an Application-Specific Integrated Circuit (ASIC), a new ASIC has to be developed each time an error correction coding and encryption scheme changes. As another example, if a division of a binary polynomial is processed using a programmable processor, a flexible response to a change in a standard may be provided. However, the range of the application may be limited due to a low processing amount of the division.

SUMMARY

In one general aspect, there is provided an apparatus that includes n XOR operators to receive a first input value and a second input value, and to generate an output value based on a selective XOR operation value obtained by performing a selective XOR operation on the first input value and the second input value, wherein n is an integer equal to or greater than 2; a first storage unit to store a first binary value; and a second storage unit to store a second binary value, wherein, if a Most Significant Bit (MSB) of the second input value is set to "1", an XOR operation value obtained by performing an XOR operation on the first input value and the second input value is generated as a result of the selective XOR operation, wherein, if the MSB of the second input value is set to "0", the second input value is generated as a result of the selective XOR operation, wherein a first input value of each of the n XOR operators is the first binary value, wherein a second input value of a first XOR operator among the n XOR operators is the second binary value, and wherein a second input value of a k-th XOR operator among the n XOR operators is obtained by shifting, by 1 bit toward an MSB, the selective XOR operation value by a (k−1)-th XOR operator, wherein k is an integer equal to or greater than 2 and equal to or less than n.

The first storage unit and the second storage unit may be registers of the operation apparatus.

The first binary value may represent a divisor binary polynomial, and the second binary value may represent a portion of a dividend binary polynomial.

If the MSB of the second input value is set to "1", each of the n XOR operators may output the XOR operation value as a result of the selective XOR operation. If the MSB of the second input value is set to "0", each of the n XOR operators may output the second input value as a result of the selective XOR operation. The second input value of the k-th XOR operator may be obtained by shifting an output value of the (k−1)-th XOR operator by 1 bit toward the MSB.

Each of the n XOR operators may include an XOR logic circuit to generate an intermediate output value by performing the selective XOR operation on the first input value and the second input value based on a value of the MSB of the second input value, and a shift logic circuit to generate the output value by shifting the intermediate output value by 1 bit toward the MSB. The second input value of the k-th XOR operator among the n XOR operators may be the same as an output value of the (k−1)-th XOR operator.

The shift logic circuit may shift the intermediate output value by 1 bit toward the MSB, and may insert "0" as a Least Significant Bit (LSB) of the shifted intermediate output value.

The operation apparatus may further include n condition value determiners that correspond to the n XOR operators. An m-th condition value determiner among the n condition value determiners may examine a value of an MSB of a second input value of an m-th XOR operator from among the n XOR operators. If the MSB of the second input value of the m-th XOR operator has a value of "1", the m-th condition value determiner may control the m-th XOR operator to perform an XOR operation on the first input value and the second input value.

The operation apparatus may further include an operation controller to control the n condition value determiners.

The operation controller may receive an input of a number p which represents operation counts performed, and may generate a resultant value based on an output value of a p-th XOR operator among the n XOR operators.

The operation controller may store the resultant value as a value of the second storage unit.

The operation controller may control the n condition value determiners, to control only the first XOR operator through the p-th XOR operator among the n XOR operators to be operated.

In another general aspect, there is provide a method for dividing a binary polynomial that includes a first load operation of storing, in a dividend storage unit, a value represented by a first portion of a dividend polynomial, a first division operation of updating the dividend storage unit with a value that is obtained by shifting a remainder by "q" bits toward an MSB of the dividend storage unit, the remainder being obtained by dividing the value stored in the dividend storage unit by a divisor polynomial, a result transfer operation of updating the value stored in the dividend storage unit with a value obtained by XORing the value stored in the dividend storage unit and a value represented by a second portion of the dividend polynomial, and a second division operation of updating the dividend storage unit with the value obtained by shifting the remainder by the "q" bits toward the MSB, wherein the first portion and the second portion of the dividend polynomial are consecutive, and "q" represents a difference between a bit length of the dividend storage unit and a bit length of the divisor polynomial.

The first division operation may include a first partial division operation of updating the dividend storage unit with a value that is obtained by shifting a remainder by "a" conditional bits toward the MSB of the dividend storage unit, the remainder being obtained by dividing, by the "a" conditional bits, the value stored in the dividend storage unit by the divisor polynomial, and a second partial division operation of updating the dividend storage unit with a value that is obtained by shifting a remainder by "b" conditional bits toward the MSB of the dividend storage unit, the remainder being obtained by dividing, by the "b" conditional bits, the value stored in the dividend storage unit by the divisor polynomial, wherein a sum of "a" and "b" is equal to or less than the bit length of the dividend storage unit.

The first division operation may include at least one partial division operation. A "d"-th partial division operation from among the at least one partial division operation may be performed to update the dividend storage unit with a value that is obtained by shifting a remainder by "$a_d$" conditional bits toward the MSB of the dividend storage unit, the remainder being obtained by dividing, by the "$a_d$" conditional bits, the value stored in the dividend storage unit by the divisor polynomial. A sum of conditional bits used by each of the at least one partial division operation may be equal to the bit length of the dividend storage unit.

The divisor polynomial may be stored in a divisor storage unit, and the dividend storage unit and the divisor storage unit may be registers of the operation apparatus.

The result transfer operation may include a second load operation of storing, in a temporary storage unit, the value represented by the second portion, and a remainder application operation of updating the value stored in the dividend storage unit with a value obtained by XORing the value stored in the dividend storage unit and the value stored in the temporary storage unit.

In another aspect, there is provided a computer readable storage medium having stored therein program instructions to cause a processor to implement a method including a first load operation of storing, in a dividend storage unit, a value represented by a first portion of a dividend polynomial, a first division operation of updating the dividend storage unit with a value that is obtained by shifting a remainder by "q" bits toward a Most Significant Bit (MSB) of the dividend storage unit, the remainder being obtained by dividing the value stored in the dividend storage unit by a divisor polynomial, a result transfer operation of updating the value stored in the dividend storage unit with a value obtained by XORing the value stored in the dividend storage unit and a value represented by a second portion of the dividend polynomial, and a second division operation of updating the dividend storage unit with the value obtained by shifting the remainder by the "q" bits toward the MSB, wherein the first portion and the second portion of the dividend polynomial are consecutive, and "q" represents a difference between a bit length of the dividend storage unit and a bit length of the divisor polynomial.

In another aspect, there is provided a single instruction multiple-data (SIMD) processor for performing a division of a binary polynomial, the processor including a partitioner configured to partition the binary polynomial into a plurality of portions based on a maximum binary length capable of being processed by an SIMD operator of the SIMD processor, and an SIMD operator configured to perform a division operation on a first portion of the plurality of portions of the binary polynomial using a divisor polynomial, wherein the division operation comprises simultaneously performing selective exclusive OR (XOR) operations on each bit of the first portion from the most significant bit (MSB) to the least significant bit (LSB).

The SIMD operator may be further configured to perform a division operation on a second portion from the plurality of portions using the divisor polynomial, and the division operation on the second portion may comprise transferring a result of the division operation of the first portion and applying the result to the second portion.

The SIMD processor may further comprise a register that comprises a first register unit configured to store the divisor polynomial and a second register unit configured to store the plurality of portions.

Other features and aspects may be apparent from the following detailed description, the drawings, and the claims.

Figure 1:
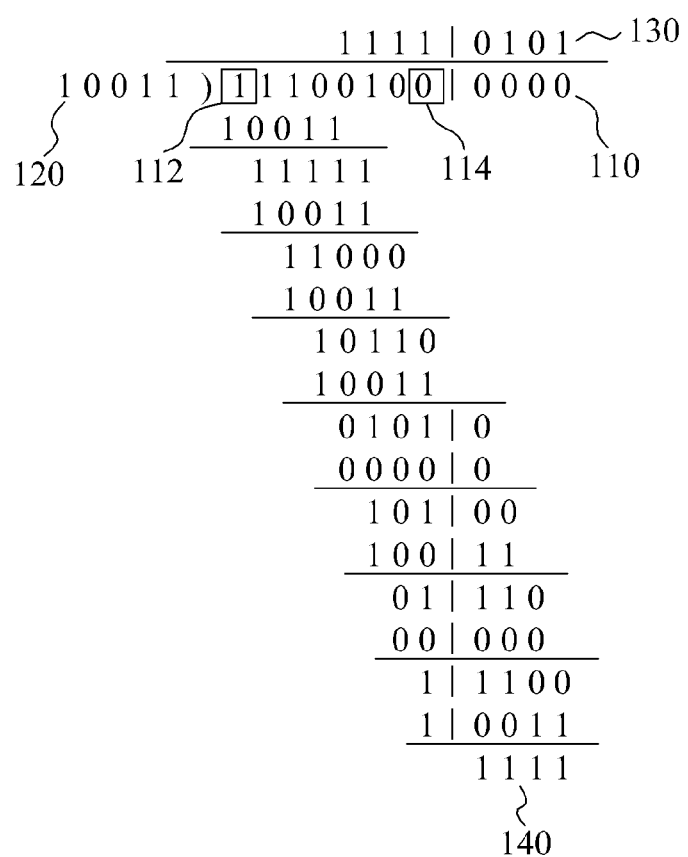
FIG. 1 is a diagram illustrating an example of a division of a Galois field binary polynomial.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, description of well-known functions and constructions may be omitted for increased clarity and conciseness.

FIG. 1 illustrates an example of a division of a Galois field binary polynomial.

"Referring to FIG. 1, a dividend 110 may be obtained by representing a binary polynomial such as "$X^{11}+X^{10}+X^9+X^6$" using binary numbers. A divisor 120 may be obtained by representing a binary polynomial such as $X^4+X+1$ using binary numbers. A quotient 130 of the division is represented as a binary value "11110101". The binary value "11110101" may indicate a binary polynomial such as "$X_7+X^6+X^5+X^4+X^2+1$". A remainder 140 of the division is represented as a binary value "1111". The binary value "1111" may indicate a binary polynomial such as "$X^3+X^2+X+1$."

In the division, a condition value may be used to determine a mode of an operation. The condition value may be taken from a Most Significant Bit (MSB) 112 of the dividend 110.

In a first operation, if a condition value is set to "1", a location of a divisor may be adjusted such that an MSB of the divisor and the condition value are arranged in the same column. Subsequently, an exclusive OR (XOR) operation may be performed on the divisor and a part of a dividend which is aligned with the divisor polynomial by column In this example, the XOR operation may be performed bitwise. The XOR operation and other XOR operations may be XOR vector operations. A binary value that indicates a dividend may be updated by the XOR operation. For example, an XOR operation for the first condition value may enable updating of the dividend 110 from "111001000000" to "011111000000".

In a second operation, if a condition value is set to "0", an XOR operation may not be performed, or it may be assumed that a dividend and bits filled with zeros are XORed.

After the first operation and the second operation, a bit located in a right side of a current condition value may be used as a new condition value in a third operation. The first operation and the second operation may be repeated with respect to the new condition value. The first operation and second operation are referred to as "selective XOR operations".

The first operation through the third operation may be repeated until a length of a remaining portion of the dividend that includes the condition values is equal to a length of the divisor. For example, if a divisor polynomial includes n bits, the bits located between the MSB 112 and an n-th bit 114 counting from a right side of the divisor 120 may be sequentially used as a condition value.

If the n-th bit 114 is used as a condition value, and if the first operation and the second operation are performed on the n-th bit 114, an (n−1)-th bit counting from the right side to a last bit of the divisor 120 may be obtained as the remainder 140.

The division of the Galois field binary polynomial may include a series of sequential XOR operations, as described herein. The XOR operations may correlate to each other. That is, a result of an XOR operation may have an influence on a result of a next XOR operation.

Accordingly, it is difficult to simultaneously perform the XOR operations to reduce a calculation time. Additionally, due to the above characteristics, if a dividend polynomial is lengthened, it may take a long period of time to perform the division.

Figure 2:
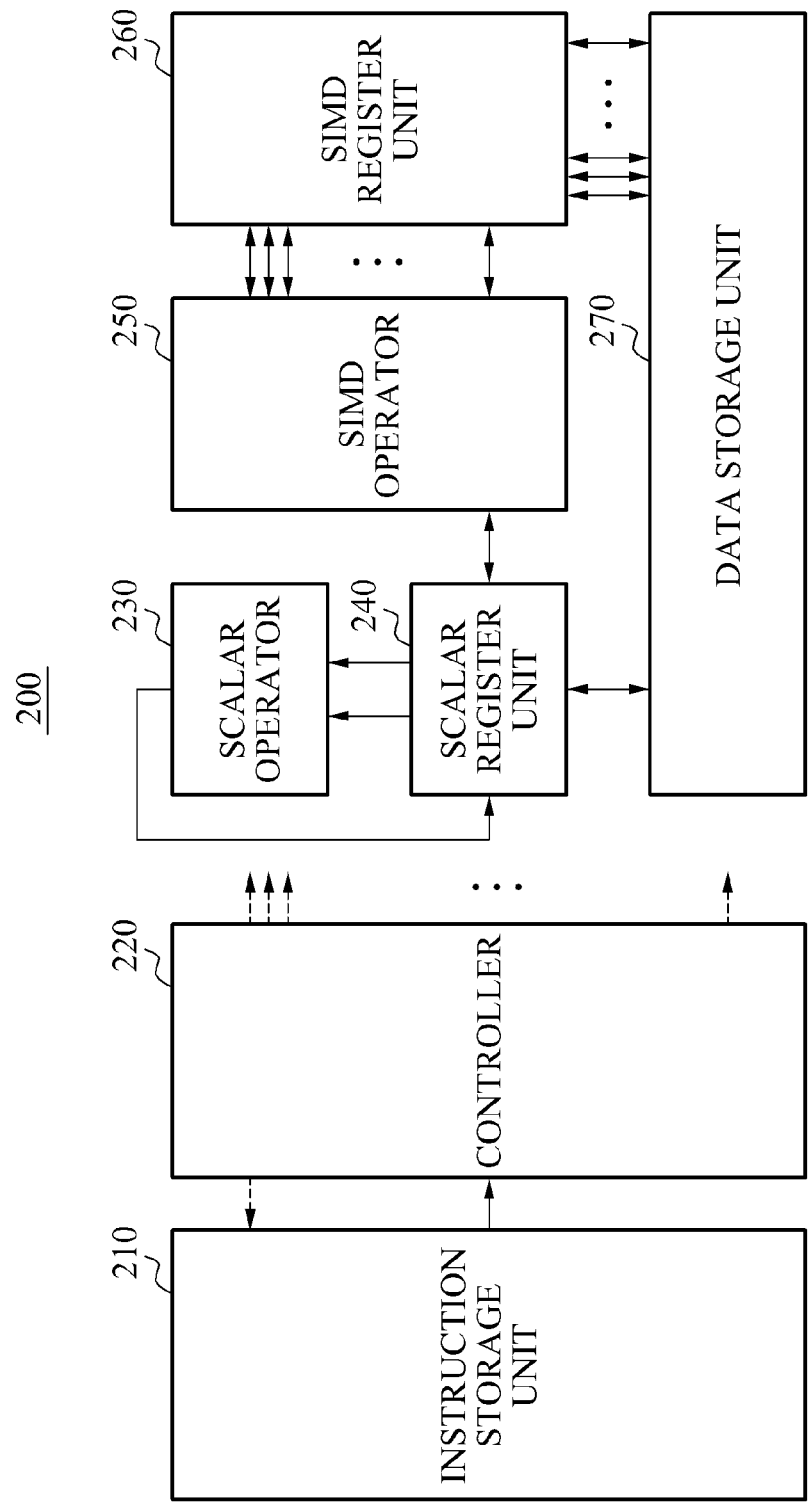
FIG. 2 is a diagram illustrating an example of an apparatus for performing a division of a Galois field binary polynomial based on Single Instruction Multiple Data (SIMD).

FIG. 2 illustrates an example of an apparatus for performing a division of a Galois field binary polynomial based on Single Instruction Multiple Data (SIMD).

Referring to FIG. 2, apparatus 200 may perform a division of a Galois field binary polynomial based on Single Instruction Multiple Data (SIMD). In this example, the apparatus 200 includes an instruction storage unit 210, a controller 220, a scalar operator 230, a scalar register unit 240, a SIMD operator 250, a SIMD register unit 260, and a data storage unit 270.

The instruction storage unit 210 may store instructions.

The controller 220 may generate a control signal using the stored instruction.

The data storage unit 270 may store input data that is used for an operation, and data generated as a result of the operation.

The scalar operator 230 may process an operation that is difficult to be processed in parallel. The scalar register unit 240 may include registers that are used to perform an operation by the scalar operator 230.

The SIMD operator 250 may process an operation to process a plurality of pieces of data using a single instruction. The SIMD register unit 260 may include registers that are used to perform an operation by the SIMD operator 250.

Figure 3:
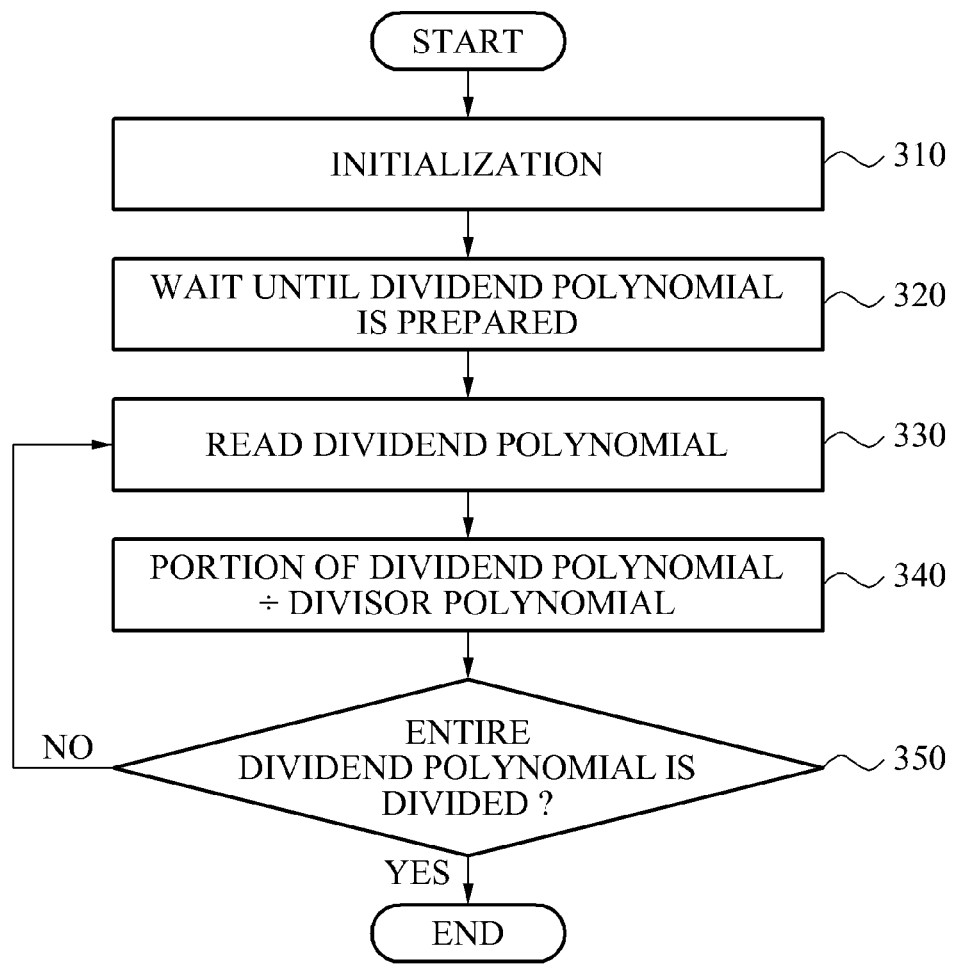
FIG. 3 is a flowchart illustrating an example of a division operation.

FIG. 3 illustrates an example of a division operation.

Referring to FIG. 3, in 310, the apparatus performs an initialization. For example, information used for the division operation may be read from the data storage unit 270. The basic information may include, for example, a divisor, a length of a dividend polynomial, a coefficient of a divisor polynomial, and the like. In 320, the apparatus waits until the dividend polynomial is prepared.

In 330, in response to the dividend polynomial being prepared, the apparatus reads the prepared dividend polynomial from the data storage unit 270. In 340, the SIMD operator 250 divides a portion of the dividend polynomial by a divisor polynomial that may be prepared in advance.

In 350, a determination is made as to whether the entire dividend polynomial is divided. If there is a portion still to be divided by the divisor polynomial in the dividend polynomial, operation 320 is repeated.

Figure 4:
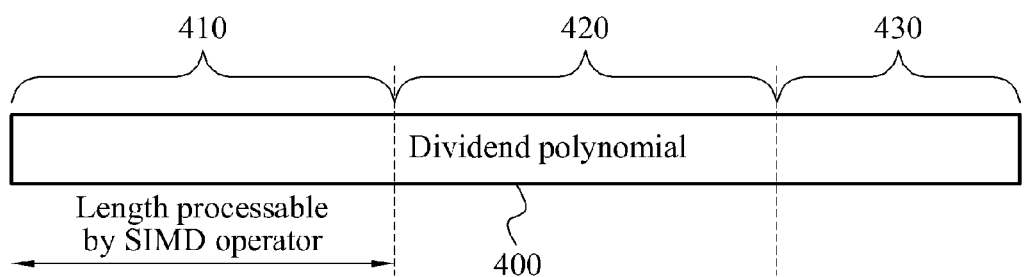
FIG. 4 is a diagram illustrating an example of a partition of a dividend polynomial.

FIG. 4 illustrates an example of a partition of a dividend polynomial.

In the case that the dividend polynomial 400 is too long, the dividend polynomial 400 may not be processed all at once by the SIMD operator 250.

Referring to FIG. 4, the dividend polynomial 400 may be read for each length that is processable by the SIMD operator 250. For example, the dividend polynomial 400 may be partitioned into three portions such as a first portion 410, a second portion 420, and a third portion 430, based on a length that is processable by the SIMD operator 250. In this example, each of the first portion 410 and the second portion 420 has a maximum length that may be processed by the SIMD operator 250. The third portion 430 is a length that is obtained by excluding the lengths of the first portion 410 and the second portion 420 from the total length of the dividend polynomial 400.

For example, information that is obtained by reading the dividend polynomial 400 (that is, the first portion 410, the second portion 420 or the third portion 430) may be stored in the register of the SIMD register unit 260.

Figure 7:
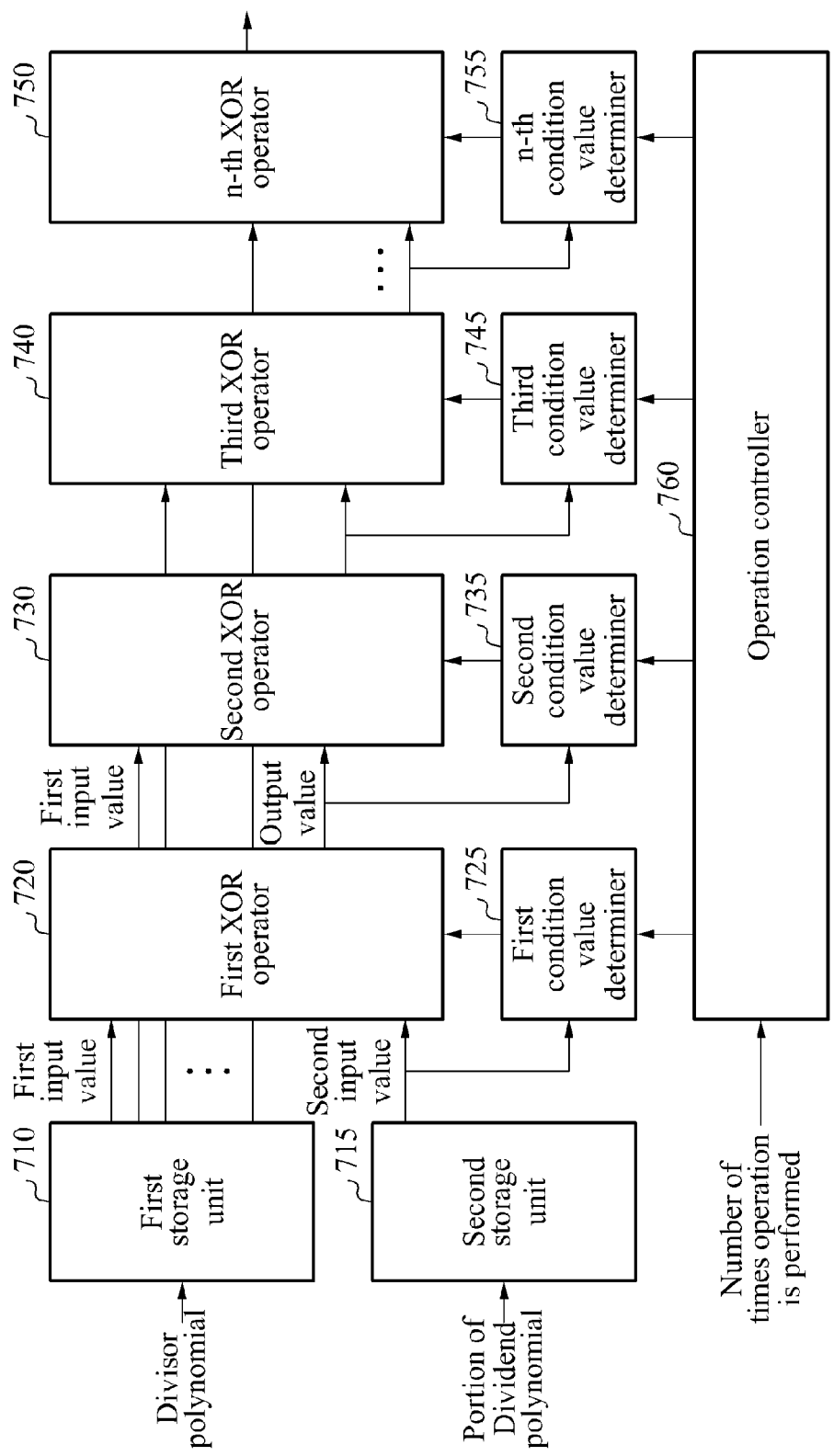
FIG. 7 is a diagram illustrating an example of an apparatus that performs a plurality of selective exclusive OR (XOR) operations.

For example, the apparatus shown in FIG. 2 and the apparatus shown in FIG. 7 may further comprise a partitioner (not shown) to partition the dividend polynomial.

Figure 5:
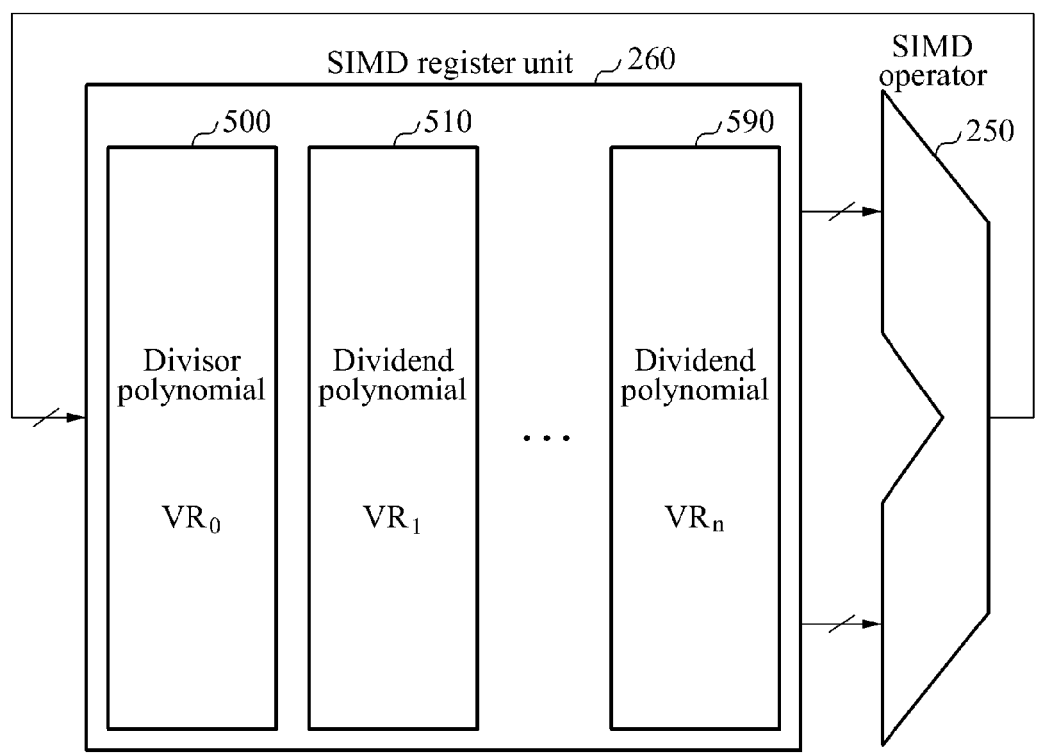
FIG. 5 is a diagram illustrating an example of the operations of a Single Instruction Multiple Data (SIMD) operator and a SIMD register

FIG. 5 illustrates an example of operations of the SIMD operator 250 and the SIMD register unit 260.

Referring to FIG. 5, the SIMD register unit 260 includes N+1 registers, for example, a register $VR_0$ 500 through a register $VR_N$ 590. The information regarding the first portion 410 to the third portion 430 may be stored in a register $VR_1$ 510.

As an example, the divisor polynomial may be stored in the register $VR_0$ 500. The divisor polynomial may be loaded in the register $VR_0$ 500, before the first portion 410 through the third portion 430 are loaded in the register $VR_1$ 510.

An example of dividing the dividend polynomial 400 (or at least one of the first portion 410 through the third portion 430) by the divisor polynomial is expressed as a selective XOR operation between the dividend polynomial 400 (or at least one of the first portion 410 through the third portion 430) and the divisor polynomial.

If the binary polynomial division is performed using the operation apparatus 200, the following two factors may be considered. First, to increase a processing amount, a number of polynomial operations that may be processed per unit time may be increased. Accordingly, there is a desire for a scheme of effectively processing a plurality of XOR operations at the same time. Second, a length of a SIMD operation that may be performed by the operation apparatus 200 may be limited. Accordingly, if data input to the operation apparatus 200 has a long length, the operation apparatus 200 may divide the input data into portions that are capable of being processed by the operation apparatus 200, and may process the portions of the data several times. An example of processing the divided data is described with reference to operations 330 to 350 of FIG. 3.

If the input data is partitioned and processed, a result of an operation performed on a previous portion of the input data may be used to perform an operation on a next operation of the input data. Accordingly, a result of a previous operation may be transferred to a next operation.

Figure 6:
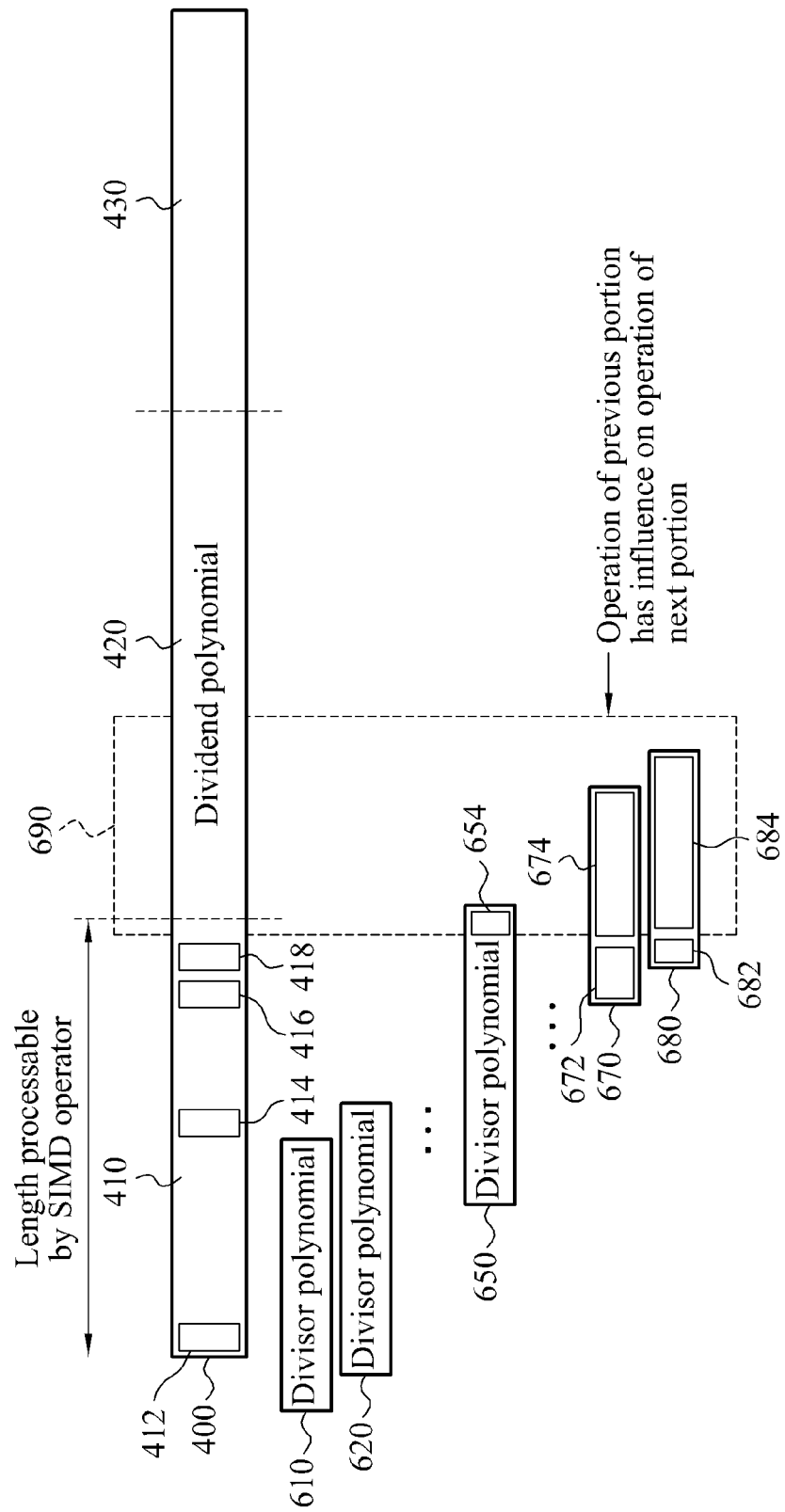
FIG. 6 is a diagram illustrating an example of a correlation between SIMD operation results.

FIG. 6 illustrates an example of a correlation between SIMD operation results.

Referring to FIG. 6, a division for the first portion 410 of the dividend polynomial 400 may be performed. Selective XOR operations may be performed on all of the bits of the first portion 410, in an order from an MSB 412 to an LSB 418. A column of a divisor polynomial may be aligned to the MSB 412, and a first selective XOR operation 610 may be performed. Additionally, the column of the divisor polynomial may be aligned to a bit that is next to the MSB 412, and a second selective XOR operation 620 may be performed. In this example, the divisor polynomial may include n bits.

In an example in which a (n−1)-th bit 414 of the first portion 410 is used as a condition value, a portion 654 of a result of a third selective XOR operation 650 (that is, a last bit of the result of the third selective XOR operation 650) may influence a division operation for the second portion 420. Therefore, the portion 654 of the result of the third selective XOR operation 650 may be reflected on the division operation for the second portion 420.

In another example in which a second bit 416 of the first portion 410 is used as a condition value, a portion 674 of a result of a fourth selective XOR operation 670 (that is, bits other than two bits (672) (that is, an MSB and a bit next to the MSB) of the fourth selective XOR operation 670) may be reflected on the division operation for the second portion 420.

In another example in which the LSB 418 of the first portion 410 is used as a condition value, a portion 684 of a result of a fifth selective XOR operation 680 (that is, bits other than an MSB 682 of the fifth selective XOR operation 680) may be reflected on the division operation for the second portion 420.

An example of a portion 690 that is to be reflected on the division operation for the second portion 420 is described with reference to FIG. 9 below.

The portions 654, 674, and 684 that have the influence on the division operation for the second portion 420 may be XORed with the second portion 420. Accordingly, a result of the division operation for the first portion 410 may be reflected on the division operation for the second portion 420. In this example, a column of each of the portions 654, 674, and 684 may be aligned to an MSB of the second portion 420.

Reflecting of the result of the division operation for the first portion 410 may be regarded as transferring a portion of the result of the division operation for the first portion 410 to the second portion 420, which is referred to as a "result transfer operation".

FIG. 7 illustrates an example of an apparatus that performs a plurality of selective XOR operations.

Referring to FIG. 7, apparatus 700 includes a first storage unit 710, a second storage unit 715, and n XOR operators, for example a first XOR operator 720, a second XOR operator 730, a third XOR operator 740, and an n-th XOR operator 750. In this example, n may be an integer that is equal to or greater than two.

Additionally, the apparatus 700 includes an operation controller 760, and n condition value determiners, for example a first condition value determiner 725, a second condition value determiner 735, a third condition value determiner 745, and an n-th condition value determiner 755 that correspond to the XOR operators 720-750.

The first storage unit 710 may be a register of the SIMD register unit 260, for example, the register $VR_0$ 500 of FIG. 5. The first storage unit 710 may store a first binary value. For example, the first binary value may be used to represent a divisor polynomial in a binary polynomial division.

The second storage unit 715 may also be a register of the SIMD register unit 260, for example, the register $VR_1$ 510 of FIG. 5. The second storage unit 715 may store a second binary value. For example, the second binary value may be used to represent at least one portion of a dividend polynomial.

Each of the first XOR operator 720 through the n-th XOR operator 750 may receive a first input value and a second input value. The first input value may be the first binary value that represents the divisor polynomial. The second input value may be the second binary value that represents the at least one portion of a dividend polynomial.

A second input value of a k-th XOR operator from among the first XOR operator 720 through the n-th XOR operator 750 may be generated based on an output value of a (k−1)-th XOR operator. In this example, k may be an integer equal to or greater than two, and equal to or less than n. As an example, a second input value of the second XOR operator 730 may be generated based on an output value of the first XOR operator 720.

Each of the first XOR operator 720 through the n-th XOR operator 750 may perform a selective XOR operation on the first input value and the second input value, and may generate an output value based on the selective XOR operation.

As described herein, if an MSB (namely, a condition value) of the second input value is set to "1", a value that is obtained by performing an XOR operation on the first input value and the second input value may be generated as a result of the selective XOR operation.

Additionally, if the MSB of the second input value is set to "0", the second input value may be generated as a result of the selective XOR operation.

A resultant value of a selective XOR operation performed by a previous XOR operator (for example, the first XOR operator 720, the second XOR operator 730, or the third XOR operator 740) may be shifted by 1 bit toward a MSB. The shifted resultant value may be transferred to a next XOR operator (for example, the second XOR operator 730, the third XOR operator 740, or the n-th XOR operator 750).

In this example, the second input value of the k-th XOR operator may be obtained by shifting, by 1 bit toward the MSB, a value that is obtained by a selective XOR operation by the (k−1)-th XOR operator. The shift operation may be performed outside a XOR operator (that is, the first XOR operator 720, the second XOR operator 730, the third XOR operator or the n-th XOR operator 750.

The first XOR operator 720 to the n-th XOR operator 750 may perform the following two operations. First, the first XOR operator 720 through the n-th XOR operator 750 may output a result of a selective XOR operation without shifting the result.

In this example, if an MSB of a second input value of each of the first XOR operator 720 through the n-th XOR operator 750 is set to "1", each of the first XOR operator 720 through the n-th XOR operator 750 may output a value that is obtained by performing an XOR operation on the first input value and the second input value. As another example, if the MSB of the second input value is set to "0", each of the first XOR operator 720 through the n-th XOR operator 750 may output the second input unit. Additionally, another component of the operation apparatus 700 may shift an output value of the previous XOR operator (for example, the first XOR operator 720, the second XOR operator 730, or the third XOR operator 740). Accordingly, the shifted output value may be provided to the next XOR operator (for example, the second XOR operator 730, the third XOR operator 740, or the n-th XOR operator 750).

Second, the first XOR operator 720 through the n-th XOR operator 750 may shift a result of a selective XOR operation by 1 bit toward a MSB, and may output the shifted result. The selective XOR operation may be controlled by the first condition value determiner 725 to the n-th condition value determiner 755.

An m-th condition value determiner from among the first condition value determiner 725 to the n-th condition value determiner 755 may control a selective XOR operation of an m-th XOR operator from among the first XOR operator 720 to the n-th XOR operator 750.

For example, the m-th condition value determiner may examine a value of a MSB of a second input value of the m-th XOR operator. In an example in which the MSB has a value of "1", the m-th condition value determiner may control the m-th XOR operator to perform a selective XOR operation on a first input value and the second input value of the m-th XOR operator. As another example in which the MSB has a value of "0", the m-th condition value determiner may control the m-th XOR operator to use the second input value, without performing the selective XOR operation.

The first condition value determiner 725 through the n-th condition value determiner 755 may store values of MSBs of second input values of the first XOR operator 720 through the n-th XOR operator 750 in the registers of the SIMD register unit 260. Each of the values of the MSBs may indicate a quotient of a polynomial division. The operation controller 760 may control the first condition value determiner 725 to the n-th condition value determiner 755.

Depending on a type of operation, not all of the first XOR operator 720 to the n-th XOR operator 750 may be operated. For example, if a length of a divisor polynomial is less than n, a same number of XOR operators from among the first XOR operator 720 through the n-th XOR operator 750 may be operated to perform a division operation as the length of the divisor polynomial.

The operation controller 760 may receive an input of a value p that represents the number of operation counts performed, and may control either the first XOR operator 720 through the n-th XOR operator 750, or the first condition value determiner 725 through the n-th condition value determiner 755, so that the first XOR operator 720 through a p-th XOR operator may be operated from among the first XOR operator 720 to the n-th XOR operator 750.

The operation controller 760 may generate a resultant value based on an output value of the p-th XOR operator, or a value obtained by shifting the output value by 1 bit toward the MSB. The operation controller 760 may transmit the resultant value as a value of the second storage unit 715. In this example, the value of the second storage unit 715 may be updated with the resultant value.

An operation performed by the operation apparatus 700 may prevent a carry signal from being generated, differently from general arithmetical operations. Accordingly, the operation may be implemented without increasing the complexity of a circuit. Additionally, the operation may use only a logic circuit instead of using a memory, and thus, the operation may be more rapidly processed while using a smaller amount of power consumption.

Figure 8:
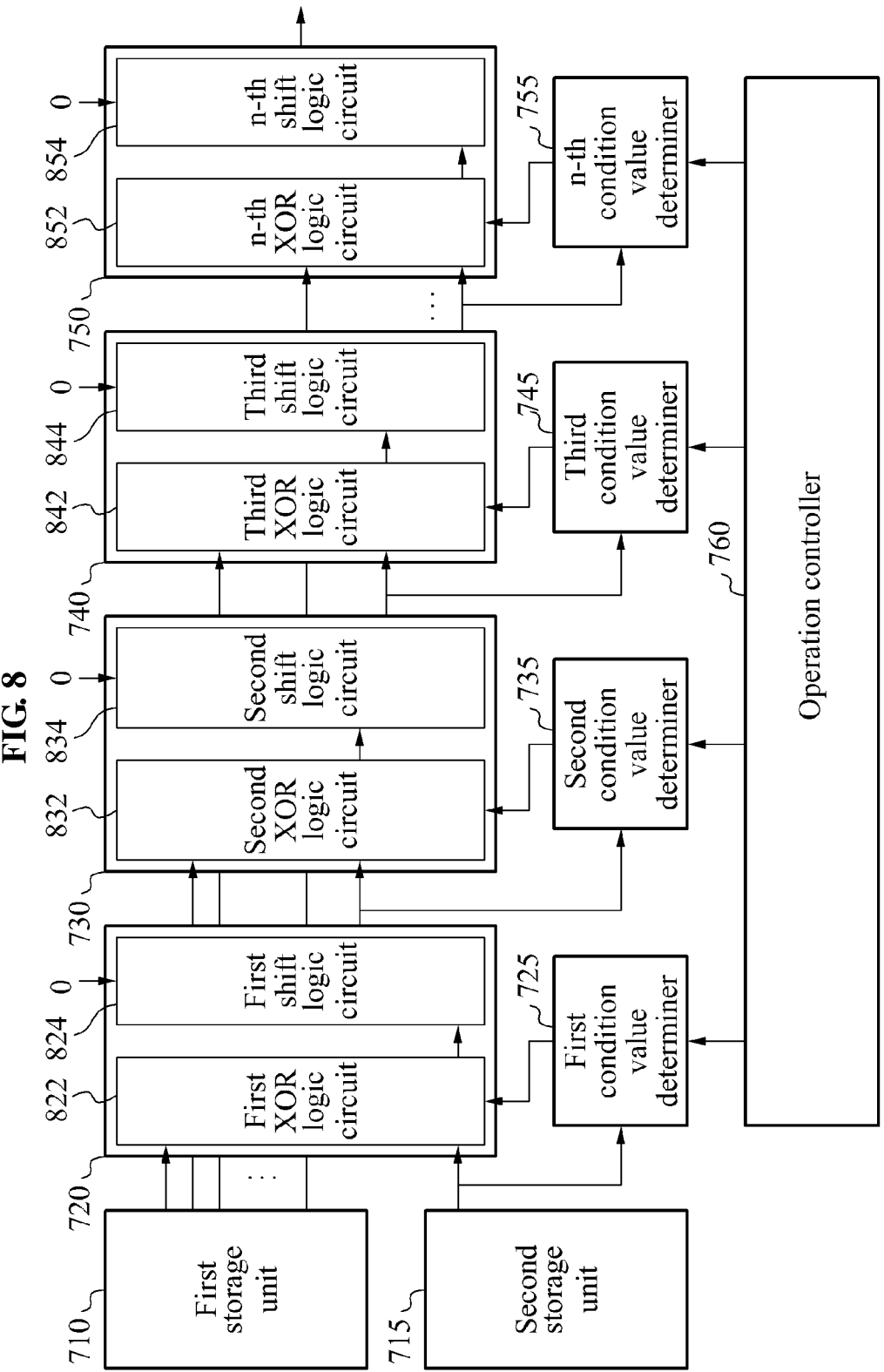
FIG. 8 is a diagram illustrating an example of an apparatus that uses an XOR operator including a shift logic circuit.

FIG. 8 illustrates an example of an apparatus that uses an XOR operator including a shift logic circuit.

Referring to FIG. 8, to connect SIMD operations under a small load, bit shift circuits may be added to the first XOR operator 720 to the n-th XOR operator 750. In this example, the SIMD operations may be performed by the first XOR operator 720 through the n-th XOR operator 750.

The bit shift circuits may enable a condition value of a dividend polynomial to always be taken from the same location such as a MSB.

Accordingly, the bit shift circuits may simplify the operation apparatus 700. For example, the bit shift circuits may enable a result of a previous SIMD operation to be simply transferred to a next SIMD operation. In this example, the result of the previous SIMD operation may be obtained by the first XOR operator 720, the second XOR operator 730, or the third XOR operator 740, and the next SIMD operation may be performed by the second XOR operator 730, the third XOR operator 740, or the n-th XOR operator 750.

Referring to FIG. 8, the first XOR operator 720 through the n-th XOR operator 750 include a first XOR logic circuit 822, a second XOR logic circuit 832, a third XOR logic circuit 842, and an n-th XOR logic circuit 852, respectively. Additionally, the first XOR operator 720 through the n-th XOR operator 750 include a first shift logic circuit 824, a second shift logic circuit 834, a third shift logic circuit 844, and an n-th shift logic circuit 854, respectively.

The first XOR logic circuit 822 may generate an intermediate output value by performing a selective XOR operation on the first input value and the second input value, based on a value of a MSB of the second input value of the first XOR operator 720.

The first shift logic circuit 824 may generate an output value by shifting the intermediate output value by 1 bit towards the MSB. A value that is output from the first shift logic circuit 824 may be used as a second input value of the second XOR operator 730. The first shift logic circuit 824 may shift the intermediate output value by 1 bit towards the MSB, and may insert a "0" as a LSB of the shifted intermediate output value.

The above-description may also be applied to the second XOR logic circuit 832 through the n-th XOR logic circuit 852, and the second shift logic circuit 834 to the n-th shift logic circuit 854.

The apparatus 700 may be a SIMD type operation apparatus that includes a plurality of XOR operators, for example the first XOR operator 720 through the n-th XOR operator 750. A SIMD type processor for improving a processing amount by controlling a plurality of operation apparatuses using a single instruction may flexibly respond to specification changes, and may provide a high processing amount.

Additionally, the apparatus 700 may perform parallel processing to increase a processing speed in comparison to an apparatus that sequentially performs XOR operations. Because the apparatus 700 does not require a memory, dimensions of a chip used to implement the operation apparatus 700 are not significantly increased.

Figure 9:
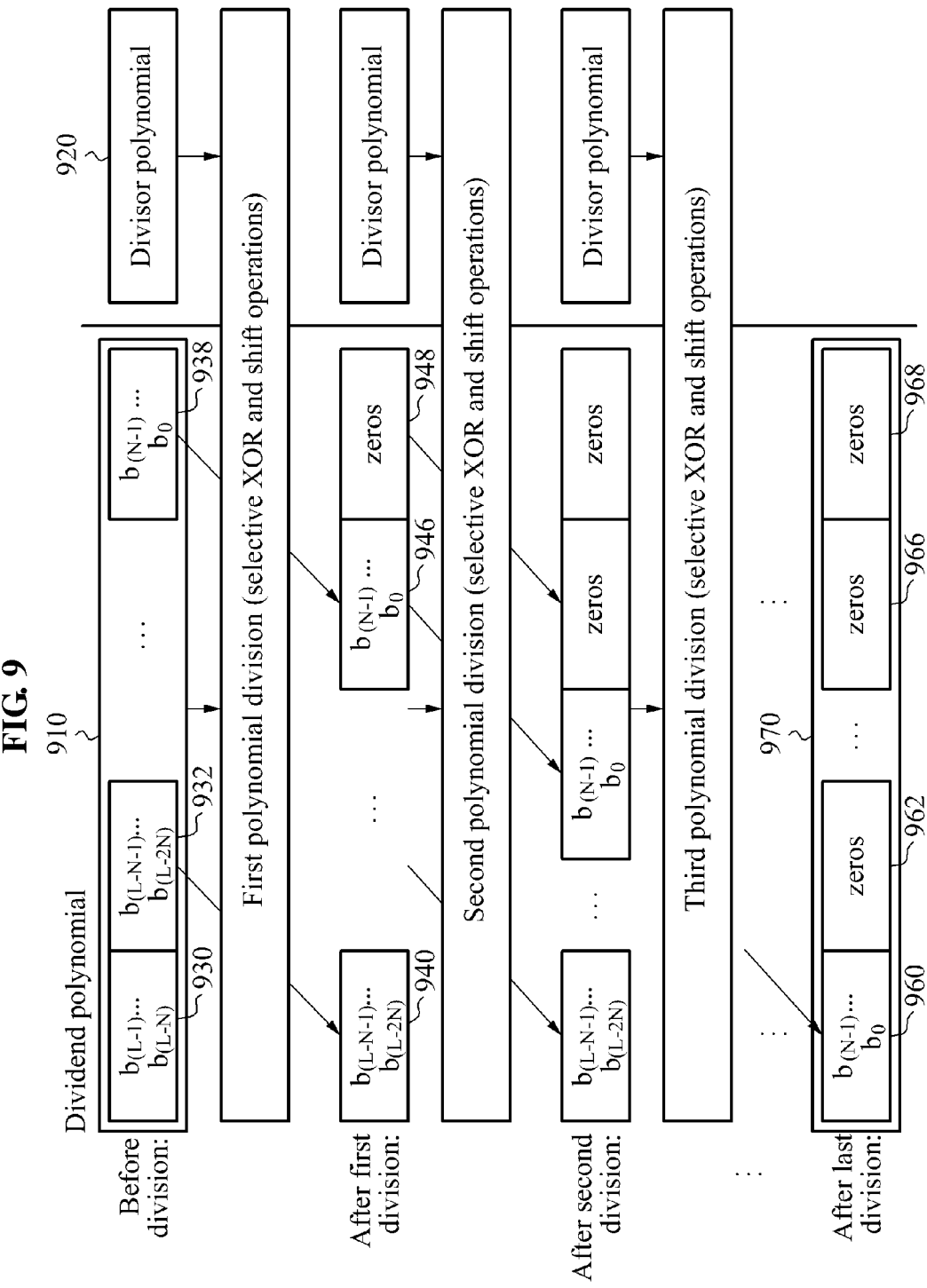
FIG. 9 is a diagram illustrating an example of data that is transferred between a series of operations when division operations are repeatedly performed in an apparatus in which a shift logic circuit is added.

FIG. 9 illustrates an example of data that is transferred between a series of operations, when division operations are repeatedly performed in an apparatus in which a shift logic circuit is added.

Referring to FIG. 9, a dividend polynomial 910 has a length L.

For example, the dividend polynomial 910 may be a portion of the dividend polynomial 400. In this example, L corresponds a length of a register of the SIMD register unit 260, for example, a length of the register $VR_1$ 510. If the dividend polynomial 400 is not capable of being loaded in a register all at once, due to a limit to the length of the register, the dividend polynomial 910 may represent at least one of the first portion 410 through the third portion 430 of the dividend polynomial 400.

The dividend polynomial 910 may include a plurality of blocks, for example a first block 930, a second block 932, and a last block 938. Each of the first block 930, the second block 932, and the last block 938 may have a length N. Among binary values that represent the dividend polynomial 910, a MSB is represented as $N_{(L-1)}$, and an LSB is represented as $b_0$. The dividend polynomial 910 may be stored, for example, in the second storage unit 715. A divisor polynomial 920 may be stored in the first storage unit 710.

In this example, N corresponds to a number of conditional bits that may be processed all at once by the operation apparatus 700, that is, N corresponds to a number of XOR operators included in the apparatus 700. Additionally, a value of N may be equal to or less than the number of conditional bits that may be processed all at once by the apparatus 700. Furthermore, N may denote a number of operation count that is input to the operation controller 760.

A first division may refer to a binary polynomial division for N bits in a front portion of the dividend polynomial 910. For example, bits $N_{(L-1)}$ through $b_{(L-N)}$ of the dividend polynomial 910 may be sequentially used as conditional bits.

The first division may be performed by the operation apparatus 700.

A selective XOR operation may be performed with respect to each of the N conditional bits by a single XOR operator from among the first XOR operator 720 to the n-th XOR operator 750 in the apparatus 700. Additionally, a resultant value of the selective XOR operation may be shifted by 1 bit toward a MSB by the XOR operator.

The shift operation may enable removal of bits corresponding to the first bit 930 from the dividend polynomial 910, for example, from the second storage unit 715.

Selective XOR operations may be applied to bits $b_{(L-N-1)}$ through $b_{(L-2N)}$ of the second block 932, and values of the bits $b_{(L-N-1)}$ through $b_{(L-2N)}$ may be changed. Additionally, the second block 932 in which the selective XOR operations are applied may be shifted to a location of the first block 930 through a shift operation.

The selective XOR operations may be applied to bits $b_{(N-1)}$ through $b_0$ of the last block 938, and values of the bits $b_{(N-1)}$ through $b_0$ may be changed. The last block 938 in which the selective XOR operations are applied may be shifted to a location of a block prior to the last block 938 through a shift operation.

A block 948 may be inserted as a last block of the dividend polynomial 910, through the shift operation. For example, the block 948 may include N zeros.

If polynomial divisions are repeated with respect to N conditional bits, the plurality of blocks of the dividend polynomial 910 may be repeatedly shifted toward the MSB by N bits, based on a result of the selective XOR operations. Blocks that include N zeros, for example blocks 948, 958, and 968, may be repeatedly inserted into empty portions that are generated by the shift operation.

After a last polynomial division is performed, the bits $b_{(N-1)}$ through $b_0$ of the last block 938 may be shifted to the location of the first block 930 in the dividend polynomial 910. Other blocks 962, 966, and 968 may each include N zeros.

After the last polynomial division, the dividend polynomial 910 may be configured with a last remaining block 960, and the blocks 962, 966, and 968, and may be stored in the second storage unit 715.

If a polynomial division is performed on a next portion of the dividend polynomial 400 (for example the second portion 420 or the third portion 430 shown in FIG. 4), the last remaining block 960 may be transferred to the next portion. For example, the last remaining block 960 may be the portion 690 of FIG. 6 that is to be reflected on the next division.

The polynomial division operation described with reference to FIG. 9 may enable a result of a polynomial division performed on a portion of the dividend polynomial 400 (for example, the first portion 410 or the second portion 420) to be reflected on a division for the next portion of the dividend polynomial 400.

If all operations for the portion of the dividend polynomial 400 that is loaded in the second storage unit 715 are completed, a polynomial division operation may be performed on the next portion of the dividend polynomial 400. In this example, an operation result 970 that is obtained by the operation for the portion of the dividend polynomial 400 may be reflected on a polynomial division operation performed on the next portion of the dividend polynomial 400.

The apparatus 700 may enable the operation result 970 to be XORed with the next portion of the dividend polynomial 400 that is newly loaded. In this example, a portion of the dividend polynomial updated by the XOR operation may refer to a portion of the dividend polynomial in which the operation result 970 is reflected.

The apparatus 700 may continue to perform the polynomial division operation using the updated portion of the dividend polynomial.

The example described with reference to FIG. 9 may be provided based on a connection rule of XOR operations.

Figure 10:
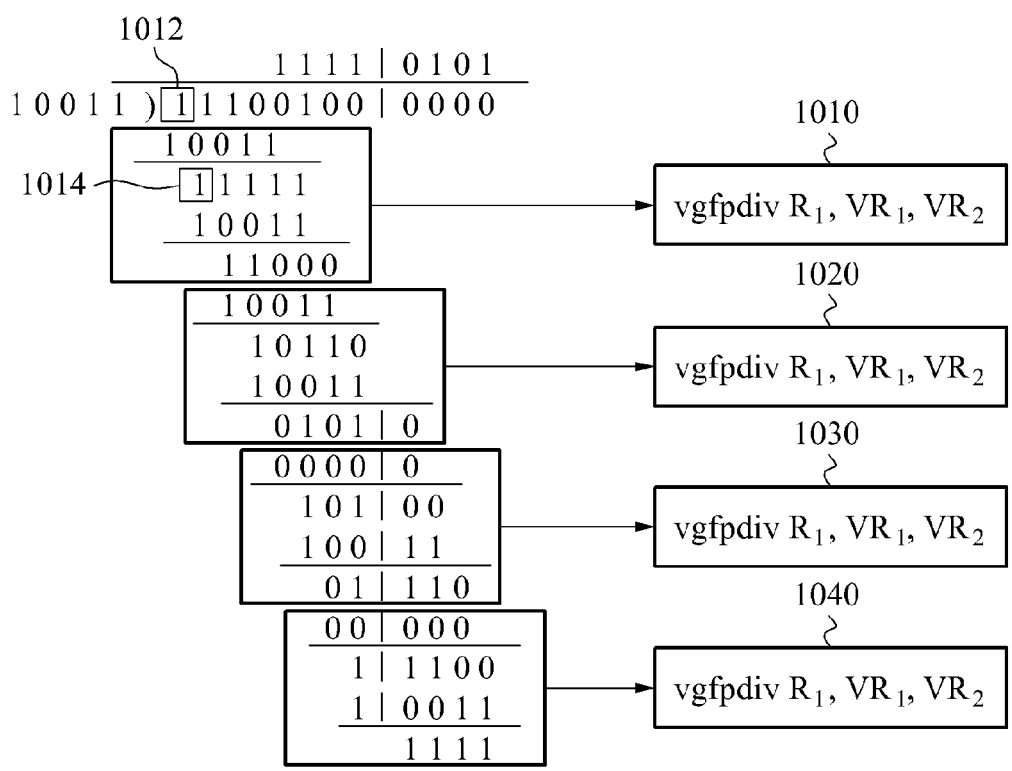
FIG. 10 is a diagram illustrating an example of a scheme of using SIMD instructions for a division of a Galois field binary polynomial.

FIG. 10 illustrates an example of a scheme of using SIMD instructions by a division of a Galois field binary polynomial.

As shown in Table 1 below, SIMD instructions may be defined to perform the operations described herein with reference to FIGS. 7 to 9.

TABLE 1

| | |
|---|---|
| vgfpdiv SR $VR_n$, $VR_m$ | An instruction "vgfpdiv" is used to divide, by "SR" bits, a dividend polynomial "$VR_m$" by a divisor polynomial "$VR_n$." In this example, "vgfpdiv" stands for "Vector Galois Field Polynomial Division". "SR" denotes a register. "SR" may be, for example, a register of the scalar register unit 240. "SR" may determine a number of condition bits to be processed while a polynomial division operation is performed by the operation apparatus 700. In this example, "SR" may store a number of operation count performed that is input to the operation controller 760. The length of the dividend polynomial 400 may not be a multiple of a number of the first XOR operator 720 through the n-th XOR operator 750. Accordingly, if "SR" does not exist, it may be difficult to properly divide a last portion of the dividend polynomial 400. For example, if N selective XOR operations are processed once by the instruction "vgfpdiv", and if M selective XOR operations are used for a division for a dividend polynomial, "M mod N" may not be equal to "0" ("M mod N ≠ 0"). In this example, "$VR_n$" denotes a register in which a divisor polynomial is stored. "$VR_n$" may be, for example, the first storage unit 710. In this example, "$VR_m$" denotes a register in which a dividend polynomial is stored. "$VR_m$" may be, for example, the second storage unit 715. |

TABLE 1-continued

|  | Additionally, "$VR_m$" may store the operation result 970. In other words, when the polynomial division is performed in response to the instruction "vgfpdiv", the operation result 970 may be stored in "$VR_m$". |
|---|---|
| vld $R_2$, $VR_3$ | An instruction "vld" is used to load data of the SIMD register unit 260 to "$VR_3$" using a value stored in "$R_2$" as an address. In this example, "$R_2$" denotes a register. "$R_2$" may be, for example, a register of the scalar register unit 240. "$R_2$" may store an address for data to be loaded.. In this example, "$VR_3$" denotes a register. "$VR_3$" may be, for example, a register of the SIMD register unit 260. |
| vxor $VR_2$ $VR_3$ $VR_4$ | An instruction "vxor" is used to perform an XOR operation on values stored in "$VR_2$" and "$VR_3$," and to store a value obtained by the XOR operation in "$VR_4$." In this example, "$VR_4$" denotes a register. "$VR_4$" may be, for example, a register of the SIMD register unit 260 The instruction "vxor" may be used as "vxor $VR_2$ $VR_3$ $VR_2$". In this example, "$VR_2$" denotes the operation result 970 that is generated by the instruction "vgfpdiv" and that is to be transferred to the next division. "$VR_3$" denotes the next portion of the dividend polynomial 400 (for example, the second portion 420 or the third portion 430) that is to be used in the next polynomial division. The two values $VR_3$ and $VR_4$ may be XORed, and stored in "$VR_4$". Accordingly, "$VR_4$" denotes the next portion of the dividend polynomial 400 where the operation result 970 is reflected. |

FIG. 10 illustrates an example of using a polynomial division using four instructions "vgfpdiv $R_1$, $VR_1$, $VR_2$" 1010, 1020, 1030, and 1040.

Referring to FIG. 10, a division of two bits may be performed. For example, a single instruction "vgfpdiv" from among the four instructions "vgfpdiv $R_1$, $VR_1$, $VR_2$" 1010, 1020, 1030, and 1040 may process two conditional bits. For example, a first instruction "vgfpdiv" may be used to perform selective XOR operations on a most significant conditional bit 1012, and a next conditional bit 1014.

Accordingly, in the four instructions "vgfpdiv $R_1$, $VR_1$, $VR_2$" 1010 to 1040, $R_1$ may have a value of "2", and "$VR_1$" may have a value of "$10011_2$" that represents a binary number to 10011.

In the instruction "vgfpdiv" 1010, "$VR_2$" has a value of "$111001000000_2$."

When the instruction "vgfpdiv" 1010 is executed, a value of "$VR_2$" may be updated to "$110000000000_2$." Accordingly, "$VR_2$" of the instruction "vgfpdiv" 1020 may have a value of "$110000000000_2$."

Subsequently, the instructions "vgfpdiv" 1020 to 1040 may be sequentially executed.

In response to the instruction vgfpdiv" 1040 being executed, the value of "$VR_2$" may be updated to "$111100000000_2$."

The value of "$VR_2$" may indicate the operation result 970. "$1111_2$" of "$111100000000_2$" of "$VR_2$" may indicate a remainder of the polynomial division, and "$00000000_2$" of "$111100000000_2$" of "$VR_2$" may indicate zero bits that are padded to an LSB of "$VR_2$" while the four instructions "vgfpdiv" 1010 to 1040 are executed.

"$111100000000_2$" stored in "$VR_2$" may be transferred to a division operation for the next portion of the dividend polynomial 400, in response to the instruction "vxor".

Figure 11:
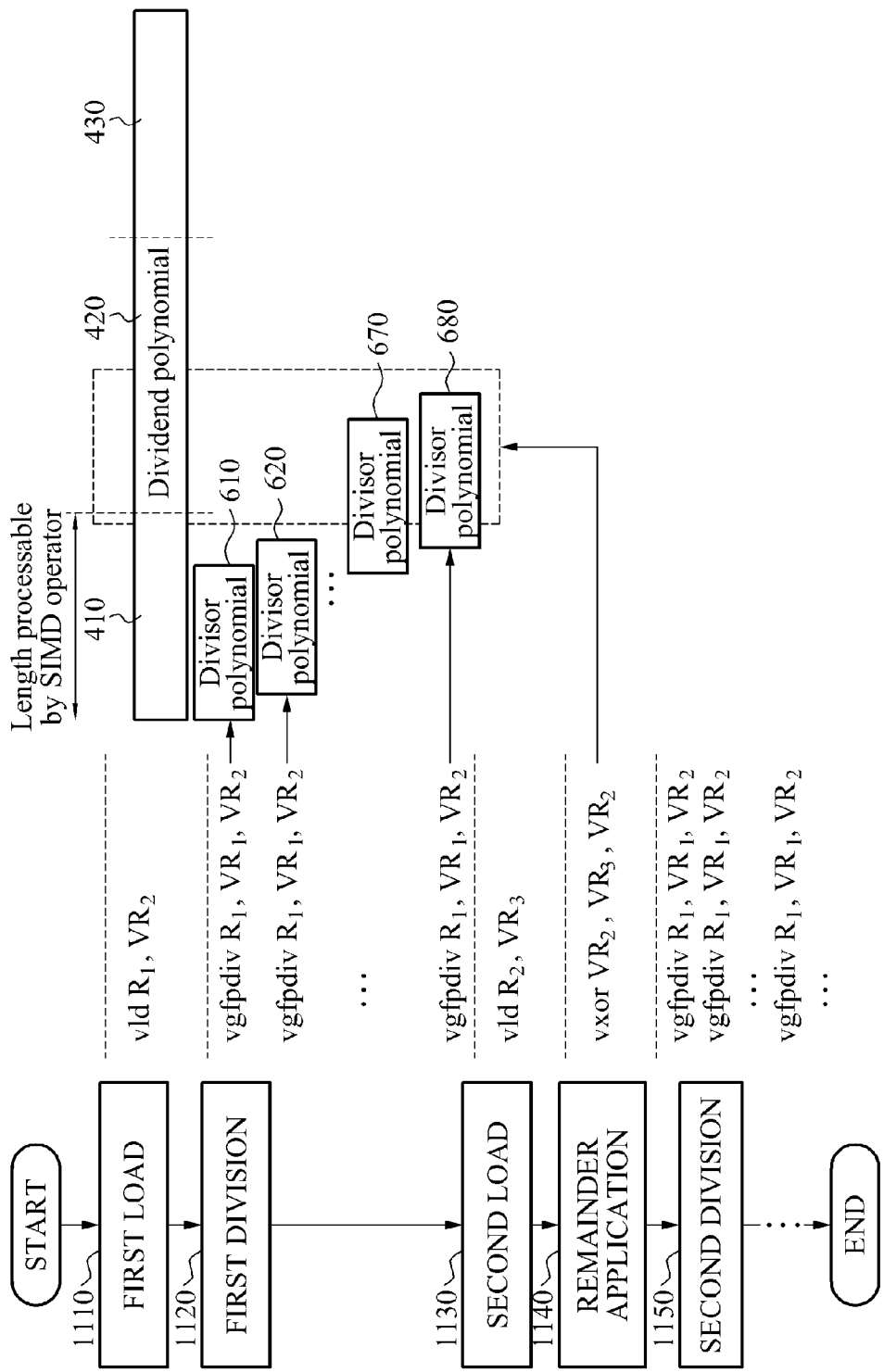
FIG. 11 is a flowchart illustrating an example of a method for performing a division operation of a binary polynomial.

FIG. 11 illustrates an example of a method for performing a division operation of a binary polynomial.

FIG. 11 illustrates operations 1110 to 1150, and instructions respectively corresponding to operations 1110 to 1150.

A divisor polynomial may be stored in a divisor storage unit. The divisor storage unit may be the first storage unit 710, or "$VR_1$."

In first load operation 1110, a value represented by the first portion 410 of the dividend polynomial 400 may be stored in a dividend storage unit. The dividend storage unit may be the second storage unit 715, or "$VR_2$." The first load operation 1110 may performed in response to an instruction "vld $R_1$, $VR_2$".

In first division operation 1120, the value stored in the dividend storage unit may be divided by the divisor polynomial, and the dividend storage unit may be updated with a resultant value that is obtained by the dividing such as the result 970 of FIG. 9.

For example, the resultant value may be obtained by shifting a remainder by "q" bits toward a MSB of the dividend storage unit. In this example, the remainder may be obtained by dividing the value that is stored in the dividend storage unit by the divisor polynomial. Additionally, "q" may indicate a number of zero bits that are padded by the polynomial division, and may represent a difference between a bit length of the dividend storage unit and a bit length of the divisor polynomial.

The first division operation 1120 may be performed in response to at least one instruction "vgfpdiv $R_1$, $VR_1$, $VR_2$". For example, the first division operation 1120 may include a first partial division operation and a second partial division operation. In the first partial division operation, a remainder may be calculated by dividing, by "a" conditional bits, the value stored in the dividend storage unit by the divisor polynomial. Subsequently, the dividend storage unit may be updated with a value that is obtained by shifting the remainder by the "a" conditional bits toward an MSB of the dividend storage unit. The first partial division operation may be performed in response to an instruction "vgfpdiv $R_1$,$VR_1$,$VR_2$". In this example, "$R_1$" may have a value of "a".

In the second partial division operation, a remainder may be calculated by dividing, by "b" conditional bits, the value stored in the dividend storage unit by the divisor polynomial. Subsequently, the dividend storage unit may be updated with a value that is obtained by shifting the remainder by the "b" conditional bits toward the MSB of the dividend storage unit.

The second partial division operation may be performed in response to an instruction "vgfpdiv $R_1$,$VR_1$,$VR_2$". In this example, "$R_1$" may have a value of "b". A sum of "a" and "b" may be equal to or less than the bit length of the dividend storage unit. Additionally, first division operation 1120 may include at least one partial division operation.

In a "d"-th partial division operation among the at least one partial division operation, a remainder may be calculated by dividing, by "$a_d$" conditional bits, the value stored in the dividend storage unit by the divisor polynomial. Subsequently, the dividend storage unit may be updated with a value that is obtained by shifting the remainder by the "$a_d$" conditional bits toward the MSB of the dividend storage unit.

A sum of the conditional bits used by each of the at least one partial division operation may be equal to the bit length of the dividend storage unit. Subsequently, a result transfer operation may be performed.

In the result transfer operation, the value stored in the dividend storage unit may be updated with a value that is obtained by performing an XOR operation on the value stored in the dividend storage unit and a value represented by the second portion 420 of the dividend polynomial 400. The result transfer operation includes a second load operation 1130 and a remainder application operation 1140.

For example, in second load operation 1130, the value represented by the second portion 420 may be stored in a temporary storage unit. The temporary storage unit may be, for example, "VR$_3$." Second load operation 1130 may be performed in response to an instruction "vld R$_2$, VR$_3$".

In remainder application operation 1140, the value that is stored in the dividend storage unit may be updated with a value that is obtained by performing an XOR operation on the value stored in the dividend storage unit and the value stored in the temporary storage unit. Remainder application operation 1140 may be performed in response to an instruction "vxor VR$_2$, VR$_3$, VR$_2$".

In second division operation 1150, the value that is stored in the dividend storage unit may be divided by the divisor polynomial, and the dividend storage unit may be updated with the resultant value that is obtained by the dividing. The second division operation 1150 may be performed in response to at least one instruction "vgfpdiv R$_1$, VR$_1$, VR$_2$".

The first portion 410 and the second portion 420 of the dividend polynomial 400 may be consecutive.

After second division operation 1150, similar operations to operations 1130 to 1150 may be repeatedly performed until processing of the third portion 430 of the dividend polynomial 400 is completed.

The examples described herein with reference to FIGS. 1 to 10 may be applied to the example illustrated in FIG. 11.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments to disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running The apparatuses described herein may be or may be included in a terminal. As a non-exhaustive illustration only, a terminal/device/unit described herein may refer to mobile devices such as a cellular phone, a personal digital assistant (PDA), a digital camera, a portable game console, and an MP3 player, a portable/personal multimedia player (PMP), a handheld e-book, a portable lab-top PC, a global positioning system (GPS) navigation, and devices such as a desktop PC, a high definition television (HDTV), an optical disc player, a setup box, and the like capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus, comprising:
n exclusive OR (XOR) operators to receive a first input value and a second input value, and to generate an output value based on a selective XOR operation value that is obtained by performing a selective XOR operation on the first input value and the second input value, wherein n is an integer equal to or greater than 2;
a first storage unit to store the first input value; and
a second storage unit to store the second input value,
wherein, if a Most Significant Bit (MSB) of the second input value is set to "1", an XOR operation value obtained by performing an XOR operation on the first input value and the second input value is generated as a result of the selective XOR operation,
wherein, if the MSB of the second input value is set to "0", the second input value is generated as a result of the selective XOR operation,
wherein a first input value of each of the n XOR operators is the first binary value,
wherein a second input value of a first XOR operator from among the n XOR operators is the second binary value, and
wherein a second input value of a k-th XOR operator among the n XOR operators is obtained by shifting an output of a selective XOR operation value generated by a (k−1)-th XOR operator by one bit to remove a first bit, wherein k is an integer equal to or greater than 2 and equal to or less than n.

2. The operation apparatus of claim 1, wherein the first storage unit and the second storage unit are registers of the operation apparatus.

3. The operation apparatus of claim 1, wherein the first input value represents a divisor binary polynomial, and the second input value represents a portion of a dividend binary polynomial.

4. The operation apparatus of claim 1, wherein, if the MSB of the second input value is set to "1", each of the n XOR operators outputs the XOR operation value as a result of the selective XOR operation, and wherein, if the MSB of the second input value is set to "0", each of the n XOR operators outputs the second input value as a result of the selective XOR operation.

5. The operation apparatus of claim 1, wherein each of the n XOR operators comprises:

an XOR logic circuit to generate an intermediate output value by performing the selective XOR operation on the first input value and the second input value based on a value of the MSB of the second input value; and a shift logic circuit to generate the output value by shifting the intermediate output value by 1 bit to remove the first bit.

6. The operation apparatus of claim 5, wherein the shift logic circuit shifts the intermediate output value by 1 and inserts "0" as a Least Significant Bit (LSB) of the shifted intermediate output value.

7. The operation apparatus of claim 1, further comprising:

n condition value determiners that correspond to the n XOR operators, wherein an m-th condition value determiner among the n condition value determiners examines a value of an MSB of a second input value of an m-th XOR operator from among the n XOR operators, and, if the MSB of the second input value of the m-th XOR operator has a value of "1", controls the m-th XOR operator to perform an XOR operation on the first input value and the second input value.

8. The operation apparatus of claim 1, further comprising:

an operation controller to control the n condition value determiners.

9. The operation apparatus of claim 8, wherein the operation controller receives an input of a number p which represents operation counts performed, wherein p is an integer between 1 and n, and wherein the operation controller generates a resultant value based on an output value of a p-th XOR operator from among the n XOR operators.

10. The operation apparatus of claim 9, wherein the operation controller inputs the resultant value as a value of the second storage unit.

11. The operation apparatus of claim 9, wherein the operation controller controls the n condition value determiners, to control only the first XOR operator through the p-th XOR operator from among the n XOR operators to be operated.

12. A method for dividing a binary polynomial, the method comprising:

a first load operation of storing, in a dividend storage unit, a value represented by a first portion of a dividend polynomial;

a first division operation of updating the dividend storage unit with a value that is obtained by shifting a remainder by "q" bits to remove the first "q" bits of the remainder, the remainder being obtained by dividing the value stored in the dividend storage unit by a divisor polynomial;

a result transfer operation of updating the first division operation value stored in the dividend storage unit with a value obtained by XORing the first division operation value stored in the dividend storage unit and a value represented by a second portion of the dividend polynomial; and a second division operation of updating the result transfer operation value stored in the dividend storage unit with a value obtained by shifting the result transfer operation value by "q" bits to remove the first "q" bits, wherein the first portion and the second portion of the dividend polynomial are consecutive, and "q" represents a difference between a bit length of the dividend storage unit and a bit length of the divisor polynomial.

13. The method of claim 12, wherein the first division operation comprises:

a first partial division operation of updating the dividend storage unit with a value that is obtained by shifting a remainder by "a" conditional bits to remove the first "a" bits, the remainder being obtained by dividing, by the "a" conditional bits, the value stored in the dividend storage unit by the divisor polynomial; and a second partial division operation of updating the dividend storage unit with a value that is obtained by shifting a remainder by "b" conditional bits to remove the first "b" bits, the remainder being obtained by dividing, by the "b" conditional bits, the value stored in the dividend storage unit by the divisor polynomial, wherein a sum of "a" and "b" is equal to or less than the bit length of the dividend storage unit.

14. The method of claim 12, wherein the first division operation comprises at least one partial division operation, wherein a "d"-th partial division operation from among the at least one partial division operation is performed to update the dividend storage unit with a value that is obtained by shifting a remainder by "$a_d$" conditional bits to remove the first "$a_d$" bits, the remainder being obtained by dividing, by the "$a_d$" conditional bits, the value stored in the dividend storage unit by the divisor polynomial, and wherein a sum of conditional bits used by each of the at least one partial division operation is equal to the bit length of the dividend storage unit.

15. The method of claim 12, wherein the method is performed by an operation apparatus that comprises:

n XOR operators to receive a first input value and a second input value, and to generate an output value that is based on a selective XOR operation value that is obtained by performing a selective XOR operation on the first input value and the second input value, wherein n is an integer equal to or greater than 2;

a first storage unit to store the first input value; and a second storage unit to store the second input value, wherein, if an MSB of the second input value is set to "1", an XOR operation value that is obtained by performing an XOR operation on the first input value and the second input value is generated as a result of the selective XOR operation, wherein, if the MSB of the second input value is set to "0", the second input value is generated as a result of the selective XOR operation, wherein a first input value of each of the n XOR operators is the first binary value, wherein a second input value of a first XOR operator from among the n XOR operators is the second binary value, and wherein a second input value of a k-th XOR operator from among the n XOR operators is obtained by shifting an output of a selective XOR operation value generated by a (k−1)-th XOR operator by one bit to remove a first bit, wherein k is an integer equal to or greater than 2 and equal to or less than n.

16. The method of claim 12, wherein the divisor polynomial is stored in a divisor storage unit, and wherein the dividend storage unit and the divisor storage unit are registers of an operation apparatus.

17. The method of claim 12, wherein the result transfer operation comprises:
   a second load operation of storing, in a temporary storage unit, the value represented by the second portion; and
   a remainder application operation of updating the first division operation value stored in the dividend storage unit with a value obtained by XORing the first division operation value stored in the dividend storage unit and the value stored in the temporary storage unit.

18. A non-transitory computer readable storage medium having stored therein program instructions to cause a processor to implement a method comprising:
   a first load operation of storing, in a dividend storage unit, a value represented by a first portion of a dividend polynomial;
   a first division operation of updating the dividend storage unit with a value that is obtained by shifting a remainder by "q" bits to remove the first q bits of the remainder, the remainder being obtained by dividing the value stored in the dividend storage unit by a divisor polynomial;
   a result transfer operation of updating the first division operation value stored in the dividend storage unit with a value obtained by XORing the first division operation value stored in the dividend storage unit and a value represented by a second portion of the dividend polynomial; and
   a second division operation of updating the result transfer operation value stored in the dividend storage unit with a value obtained by shifting the result transfer operation value by "q" bits to remove the first "q" bits,
   wherein the first portion and the second portion of the dividend polynomial are consecutive, and "q" represents a difference between a bit length of the dividend storage unit and a bit length of the divisor polynomial.

19. A single instruction multiple-data (SIMD) processor for performing a division of a binary polynomial, the processor comprising:
   a partitioner configured to partition the binary polynomial into a plurality of portions based on a maximum binary length capable of being processed by an SIMD operator of the SIMD processor; and
   an SIMD operator configured to perform a division operation on a first portion of the plurality of portions of the binary polynomial using a divisor polynomial,
   wherein the division operation comprises simultaneously performing selective exclusive OR (XOR) operations on each bit of the first portion from the most significant bit (MSB) to the least significant bit (LSB) using the divisor polynomial.

20. The SIMD processor of claim 19, wherein the SIMD operator is further configured to perform a division operation on a second portion from the plurality of portions using the divisor polynomial, and the division operation on the second portion comprises transferring a result of the division operation of the first portion and applying the result to the second portion.

21. The SIMD processor of claim 19, further comprising a register that comprises a first register unit configured to store the divisor polynomial and a second register unit configured to store the plurality of portions.

* * * * *